(12) United States Patent
Metreveli et al.

(10) Patent No.: US 10,061,795 B2
(45) Date of Patent: *Aug. 28, 2018

(54) GRAPH-BASED DATA MODELS FOR PARTITIONED DATA

(71) Applicant: Dropbox, Inc., San Francisco, CA (US)

(72) Inventors: Zviad Metreveli, San Francisco, CA (US); Akhil Wable, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,364

(22) Filed: Jan. 30, 2017

(65) Prior Publication Data

US 2017/0139971 A1    May 18, 2017

Related U.S. Application Data

(63) Continuation of application No. 14/025,657, filed on Sep. 12, 2013, now Pat. No. 9,576,071.

(51) Int. Cl.
*G06F 17/30* (2006.01)
*G06F 7/00* (2006.01)

(52) U.S. Cl.
CPC .... *G06F 17/30362* (2013.01); *G06F 17/3048* (2013.01); *G06F 17/30312* (2013.01); *G06F 17/30584* (2013.01); *G06F 17/30958* (2013.01)

(58) Field of Classification Search
CPC .. G06F 17/2247; G06F 8/34; G06F 17/30572; G06Q 10/10
USPC ........................................................ 707/609
See application file for complete search history.

(56) References Cited

U.S. PATENT DOCUMENTS

| | | | | |
|---|---|---|---|---|
| 6,437,804 B1* | 8/2002 | Ibe | ......................... | G06F 17/509 709/223 |
| 8,271,763 B2* | 9/2012 | Nickolls | ................ | G06F 12/109 711/202 |
| 8,739,016 B1* | 5/2014 | Goldman | ................ | G06Q 50/01 715/200 |
| 8,908,674 B2* | 12/2014 | Maier | ..................... | H04L 45/12 370/238 |
| 9,031,994 B1* | 5/2015 | Cao | ................... | G06F 17/30584 707/798 |

(Continued)

OTHER PUBLICATIONS

U.S. Appl. No. 14/025,657, filed Sep. 12, 2013, Office Action, dated Jun. 8, 2016.

(Continued)

*Primary Examiner* — Kuen S Lu
(74) *Attorney, Agent, or Firm* — Hickman Palermo Becker Bingham LLP; Adam C. Stone

(57) ABSTRACT

A method and system for managing access to data. A plurality of data items is stored across a plurality of partitions according to a graph-based data model. The data model associates each data item with an identifier of a source entity pertaining to the data item, an identifier of a destination entity pertaining to the data item, and an identifier of a type of directed relationship pertaining to the data item from the source entity to the destination entity. When a lookup request is received identifying a source entity, a particular partition is identified based on the source entity identifier. A response to the lookup request is then returned that includes data item(s) from the identified partition.

29 Claims, 7 Drawing Sheets

(56) References Cited

U.S. PATENT DOCUMENTS

| | | | |
|---|---|---|---|
| 2008/0069099 A1* | 3/2008 | Tani | H04L 12/185 370/390 |
| 2010/0145902 A1* | 6/2010 | Boyan | G06F 17/3089 706/54 |
| 2011/0246503 A1* | 10/2011 | Bender | G06F 17/30306 707/769 |
| 2012/0188249 A1* | 7/2012 | Kretz | G06N 5/02 345/440 |
| 2013/0311490 A1* | 11/2013 | Mansfield | G06F 17/211 707/755 |
| 2014/0032563 A1* | 1/2014 | Lassen | G06F 17/30315 707/741 |
| 2014/0143407 A1* | 5/2014 | Zhang | H04L 41/145 709/224 |
| 2015/0019639 A1* | 1/2015 | Marlow | H04W 4/21 709/204 |

OTHER PUBLICATIONS

U.S. Appl. No. 14/025,657, filed Sep. 12, 2013, Notice of Allowance, dated Oct. 7, 2016.

\* cited by examiner

GRAPH-BASED DATA MODELS FOR PARTITIONED DATA

CROSS-REFERENCE TO RELATED APPLICATIONS; BENEFIT CLAIM

This application claims the benefit as a Continuation of application Ser. No. 14/025,657, filed Sep. 12, 2013, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The disclosed embodiments relate to data models. More specifically, the disclosed embodiments relate to graph-based data models for partitioned data.

BACKGROUND

Content on electronic devices is commonly synchronized, stored, shared, and/or backed up on online content management systems such as file hosting services, cloud storage services, and/or remote backup services. For example, images, audio, video, documents, executables, and/or other types of content may be stored on a network-enabled electronic device such as a personal computer, laptop computer, portable media player, tablet computer, and/or mobile phone. A user of the electronic device may also have a user account with a cloud storage service that allows copies of the content to be stored and/or backed up with the cloud storage service. The cloud storage service may further transmit the copies to other electronic devices of the user and/or other users who are authorized to access the files, thus synchronizing the content between the cloud storage service and electronic devices.

In addition, the widespread creation, transmission, sharing, and/or use of content through an online content management system may require the partitioning of a data model of the content, users, and/or other entities associated with the online content management system across multiple computer systems and/or storage mechanisms. For example, data for multiple users, content items, groups of users, and/or collections of content items in the online content management system may be tracked and/or accessed using a data model that is stored in a relational database. As use of the online content management system increases, the data model may outgrow the storage capacity of the computer system hosting the relational database and require partitioning among multiple computer systems and/or database instances.

Unfortunately, partitioning of conventional relational databases may be difficult and/or inefficient. For example, partitioning of a Structured Query Language (SQL) database may require manual rewriting of code for the SQL database, which may be tedious and/or cumbersome. On the other hand, structured storage mechanisms that are easily partitioned may not meet requirements for concurrent access to online content management systems. For example, a NoSQL database that is optimized for scalability and availability may not support the atomicity, consistency, isolation, and durability (ACID) guarantees provided by relational databases. Consequently, access to data in online content management systems may be facilitated by mechanisms for improving the scalability, reliability, and integrity of data models of the data.

SUMMARY

The disclosed embodiments provide a system that manages access to data. During operation, the system provides a graph-based data model of the data, wherein the graph-based model comprises a set of nodes and a set of directed edges among the nodes. Next, the system stores the graph-based data model in a set of partitions, wherein each partition from the set of partitions includes one or more nodes from the set of nodes and all outgoing edges from the one or more nodes. Finally, the system enables lookup of a set of outgoing edges associated with a source node from the one or more nodes.

In some embodiments, the system also updates the graph-based data model using a set of transactions.

In some embodiments, updating the graph-based data model using the set of transactions involves enabling locking of a node from the set of nodes and one or more outgoing edges associated with the node during a transaction associated with the node and an edge type of the one or more outgoing edges, and enabling unlocking of the node and the one or more outgoing edges after the transaction is complete.

In some embodiments, updating the graph-based data model using the set of transactions further involves enabling rollback of the graph-based data model to a previous state of the node and the one or more outgoing edges.

In some embodiments, enabling lookup of the set of outgoing edges associated with a source node from the one or more nodes involves identifying the partition comprising the source node, and searching the outgoing edges by an identifier associated with the source node.

In some embodiments, enabling lookup of the set of outgoing edges associated with a source node from the one or more nodes further involves filtering the outgoing edges by an attribute associated with the outgoing edges.

In some embodiments, enabling lookup of the set of outgoing edges associated with a source node from the one or more nodes further involves obtaining one or more destination nodes associated with the outgoing edges, and searching a set of additional outgoing edges associated with the one or more destination nodes.

In some embodiments, each node from the set of nodes is associated with at least one of a user, a collection, an item, a notification, a group, and a namespace.

In some embodiments, the set of directed edges includes a first directed edge from a first node to a second node and a second directed edge from the second node to the first node.

BRIEF DESCRIPTION OF THE FIGURES

In the figures, like reference numerals refer to the same figure elements.

DETAILED DESCRIPTION

Figure 1:
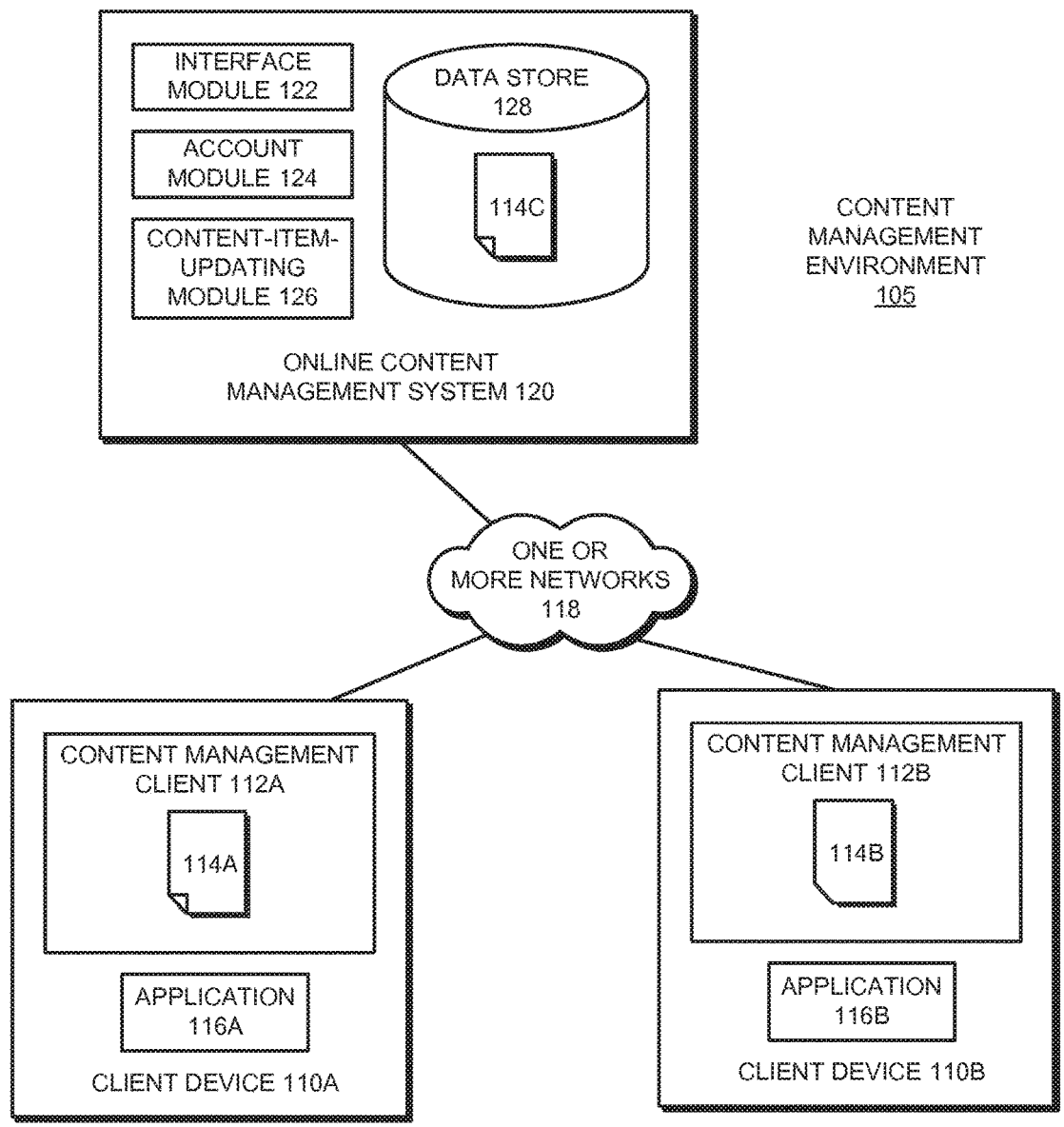
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for managing access to data. The data may represent users, groups of users, content items, collections of content items, notifications, relationships, and/or other types of associative data. As a result, the data may be stored in a graph-based data model that contains a set of nodes and a set of directed edges among the nodes.

More specifically, the disclosed embodiments provide a method and system for partitioning the graph-based data model and using transactions to update the graph-based data model. Each partition of the graph-based data model may include one or more nodes and all outgoing edges from the node(s). As a result, lookups associated with a node may be performed with only one partition instead of across multiple partitions. Moreover, the node and one or more outgoing edges from the node may be locked during a transaction associated with the node and an edge type of the outgoing edge(s) to facilitate reliable concurrent access to the graph-based data model. The node and outgoing edge(s) may then be unlocked after the transaction is complete to allow subsequent modifications to the node and/or outgoing edge(s). Along the same lines, rollback of the graph-based data model to a previous state of the node and the one or more outgoing edges may be enabled to maintain atomicity and/or support features associated with accessing and/or modifying the data.

Also, some embodiments of the system support automatic caching for queries in a manner that is consistent with the underlying database. This means the cache never has any stale data, and if data is read from cache it is equivalent to reading to the data from the underlying database. During operation of the cache, queries are automatically cached during reads when a cache miss happens, and the cache is automatically invalidated during writes. Note that during a write the system can be configured to invalidate only a small subset of the cached queries that the write could potentially change. This means the system does not have to clear the entire cache on every write.

FIG. 1 shows a schematic of a system in accordance with the disclosed embodiments. As shown in FIG. 1, the system corresponds to a content management environment 105, which includes a set of client devices 110A and 110B (collectively 110) and an online content management system 120 interconnected by one or more networks 118. Networks 118 may include a local area network (LAN), wide area network (WAN), personal area network (PAN), virtual private network, intranet, cellular network, WiFi network, Bluetooth (Bluetooth™ is a registered trademark of Bluetooth SIG, Inc.) network, universal serial bus (USB) network, and/or Ethernet network. Various aspects of client devices 110 and online content management system 120 are discussed below.

Each client device 110 may selectively execute a content management client application 112A and 112B (collectively 112) (also referred to as a "content management client") that may be used to access content items stored within online content management system 120. While only two client devices 110A and 110B are shown in FIG. 1 for purposes of clarity, those skilled in the art will appreciate that many client devices 110 may simultaneously connect through network(s) 118 to online content management system 120 at any given time. Examples of suitable client devices 110 include, but are not limited to, personal computers; mobile computing devices, such as laptop computers and/or tablet computers; handheld devices, such as a smartphone (e.g., an IPHONE™, BLACKBERRY™, or ANDROID™-based smartphone), personal digital assistant, and/or portable media player; digital media receivers; and/or other network-enabled electronic devices.

In one or more embodiments, content management client application 112 supports automatic synchronization between client devices 110 and online content management system 120. For example, content management client application 112 may automatically synchronize changes associated with a designated directory (e.g., new, deleted, modified, copied, and/or moved files and/or subdirectories within the directory) between each client device 110 and online content management system 120. To perform such synchronization, content management client application 112 may monitor a local directory corresponding to the designated directory on client devices 110 and synchronize changes to the local directory with a remote directory corresponding to the designated directory on online content management system 120. Conversely, content management client application 112 may identify changes to the remote directory and propagate the changes to the local directory.

Synchronized copies of a content item 114A, 114B and 114C may thus be maintained on client devices 110A and 110B and within online content management system 120, respectively. Alternatively, client devices 110 may provide a file-browser type interface (not shown) for directly manipulating the content items stored on online content management system 120 without maintaining a local copy. Client devices 110 may also include applications 116A and 116B (collectively 116) that manipulate copies of content items 114A and 114B. For example, applications 116 may be used to create, modify, process, and/or otherwise use documents, images, video, audio, and/or other content items (e.g., content items 114) on client devices 110.

Each client device 110 may store a local, synchronized copy of a content item from online content management system 120 in any suitable format. When content management client application 112 presents content items that are stored within online content management system 120 to a user, the content items may be arranged in directories, which may be arranged in other directories, or in any other arbitrary arrangement and/or directory structure supported by online content management system 120 and/or determined by the user. Consequently, each user's content item storage architecture may be considerably different from the next, and in some instances, the content item storage architecture may be implemented to maximize storage and content item retrieval efficiency.

Online content management system 120 stores content items and manages access to those content items via client devices 110. Online content management system 120 and its components may be implemented using any appropriate hardware and software that supports file serving, storage, and retrieval functions. For example, online content management system 120 may be implemented using one or more servers, cloud storage, network-attached storage (NAS), a storage area network (SAN), a redundant array of inexpensive disks (RAID) system, and/or other network-accessible storage. Online content management system 120 may additionally store the content items using a variety of filesystem architectures and/or hierarchies and obscure the locations and/or mechanisms involved in storing the data from client devices 110.

As shown in FIG. 1, online content management system 120 includes an interface module 122, an account module 124, a content-item-updating module 126, and a data store 128. The components of online content management system 120 are discussed below.

Interface module 122 may facilitate content item access and content item storage operations among online content management system 120 and client devices 110. Interface module 122 may receive content items from and send content items to client devices 110 consistent with each user's preferences for sharing content items. Interface module 122 may also act as the counterpart to a client-side file-explorer style user interface that allows a user to manipulate content items directly stored on online content management system 120.

In one or more embodiments, software on client devices 110 may integrate network-stored content items with the client's local filesystem to enable the user to manipulate network-stored content items through the same user interface (UI) used to manipulate content items on the local filesystem, such as through a file explorer, file finder, file chooser, and/or browser application. As an alternative or supplement to the client-side file-explorer interface, interface module 122 may provide a web interface for client devices 110 to access (e.g., via applications 116) and allow the user to manipulate content items stored within online content management system 120. In this way, the user can directly manipulate content items stored within online content management system 120.

Data store 128 may store content items such as those uploaded using client devices 110 and/or other suitable electronic devices. In the embodiment illustrated in FIG. 1, client device 110A, which is associated with a first user, is shown as locally storing at least one content item 114A, and client device 110B, which is associated with a second user, is shown as locally storing at least one content item 114B. A copy of the locally stored content item 114C may also be maintained in data store 128 of online content management system 120. Consequently, content items 114A, 114B and 114C may be local versions of the same shared document that reside on client device 110A, client device 110B and online content management system 120, respectively. Note that client devices 110A and 110B may also store other content items that are replicated on online content management system 120, but are not shared with other client devices.

Data store 128 may maintain information identifying the user, information describing the user's file directory, and/or other information in a file journal that is maintained for each user. The file journal may be maintained on online content management system 120 and/or as a "server-side file journal" on both online content management system 120 and locally on each client device 110. The file journal may be used to synchronize various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within online content management system 120 and the copy of the content item 114B on client device 110B. Similarly, any changes that are made to content item 114C on online content management system 120 may also be automatically reflected in the copy of content item 114A stored on client device 110A, and the copy of content item 114B stored on client device 110B.

Moreover, content items 114A and 114B may be stored in local caches within content management clients 112A and 112B, respectively. Alternatively, content items 114A and 114B may be stored in local filesystems within content management clients 112A and 112B. In some situations, content items 114A and 114B are stored in filesystem space that is reserved for content management clients 112A and 112B. In other situations, content items 114A and 114B are stored in normal filesystem space that is not reserved for content management clients 112A and 112B.

Account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all content items among his/her desktop computer, tablet computer, and mobile device. To make such a sharing arrangement seamless to the user, the user's single account on online content management system 120 may be associated with each of the user's respective client devices. An application running on each respective client device 110 may help to coordinate synchronization of content items on the client device with corresponding versions of the content items within the user's account in online content management system 120 and/or on the user's various other client devices.

Content-item-updating module 126 may maintain consistency among different copies (versions) of a content item 114A, 114B and 114C that are located in client device 110A, client device 110B and online content management system 120, respectively. This can be complicated, because the different versions 114A, 114B and 114C of the same shared content items may be simultaneously changed at client devices 110A-B and online content management system 120. Hence, online content management system 120 may enforce an updating policy to resolve conflicting updates to different versions of the same content item. For example, the copy of content item 114C on online content management system 120 may be designated as the master copy, and updates to copies 114A and 114B of the content item may be serialized and applied one-at-a-time to the master copy 114C before being propagated back to copies 114A and 114B located on client devices 110A and 110B, respectively.

Data store 128 and/or another data store in online content management system 120 may also store data describing content items, users, groups of users and/or content items, and/or other objects related to the structure and/or use of online content management system 120. For example, the data may describe objects and/or entities associated with online content management system 120, as well as associations and/or relationships among the objects and/or entities.

Figure 2:
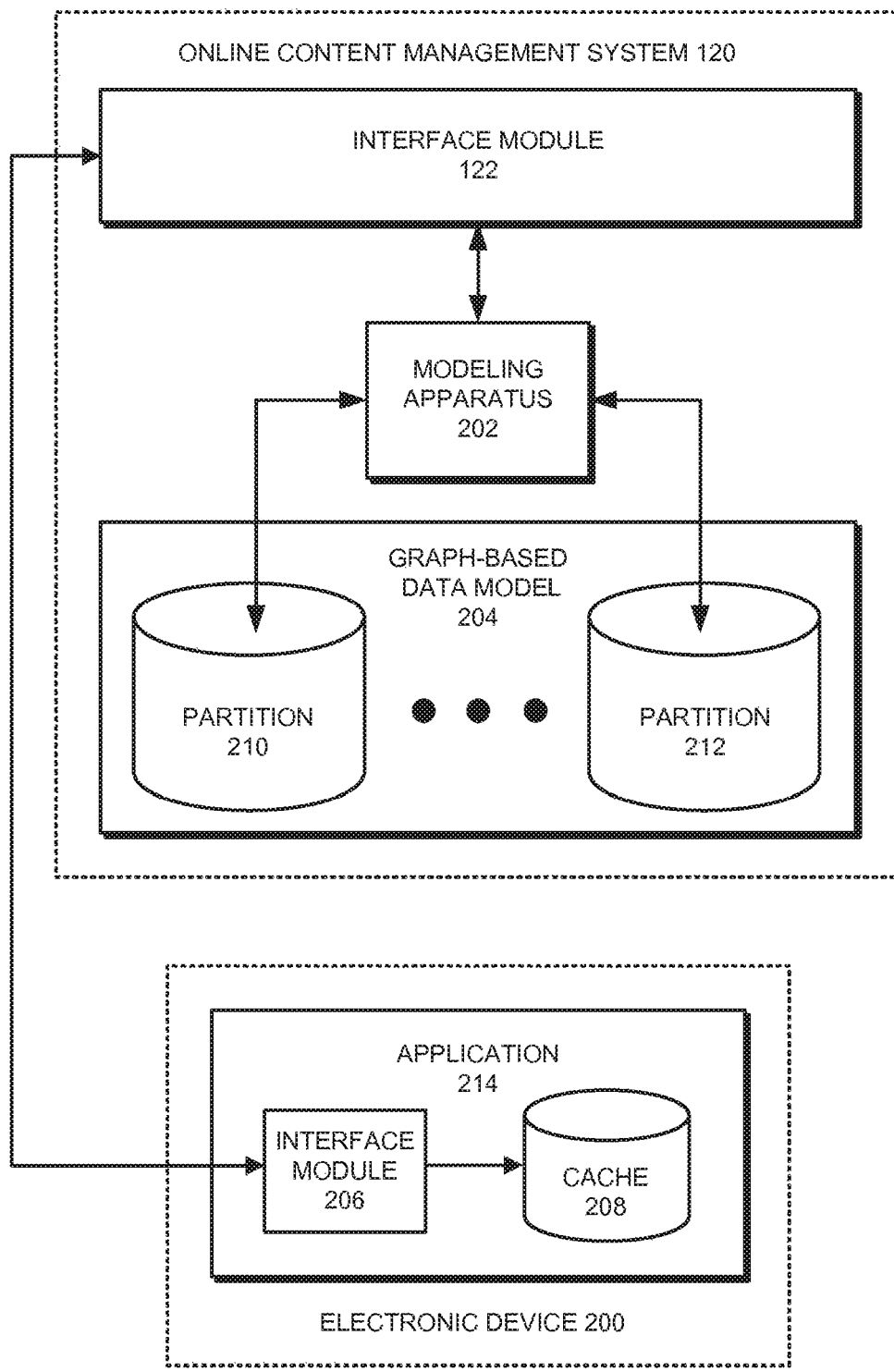
FIG. 2 shows a system for managing access to data in accordance with the disclosed embodiments.

As shown in FIG. 2, the data may be stored in a graph-based data model 204 by online content management system 120. In other words, the objects, entities, associations, and/or relationships may be stored as a set of nodes representing the objects and/or entities and a set of directed edges among the nodes representing the associations and/or relationships.

The nodes and/or directed edges may also contain attributes that store information about the corresponding objects, entities, associations, and/or relationships. For example, a node representing a collection of content items in online content management system 120 may include attributes such as a unique identifier for the collection, a name of the collection, a description of the collection, a number of content items in the collection, a modification timestamp, and/or a creation timestamp. On the other hand, a node representing a user of online content management system 120 may include attributes such as a name, email address, password, user type and/or role, storage quota, and/or unique identifier for the user. Finally, a directed edge from the user to the collection may include unique identifiers for the user and collection, as well as a set of permissions and/or a path to the collection for the user.

In addition, graph-based data model 204 may be divided among a set of partitions 210-212, with access to and update of graph-based data model 204 and/or partitions 210-212 mediated by a modeling apparatus 202 in online content management system 120. Partitions 210-212 may facilitate scaling of graph-based data model 204 as the use of online content management system 120 increases. For example, each partition 210-212 may reside on a separate physical machine. To improve the reliability and/or availability of graph-based data model 204, the partition may also be duplicated in one or more additional physical machines that operate as slaves to a "master" partition and are capable of taking over as the "master" partition in the event of fault and/or failure in the current "master" partition. As the amount of data in a partition reaches the storage capacity of the corresponding machine(s), one or more new machines may be added, and a new partition may be created on the new machine(s) to accommodate additional data in graph-based data model 204.

As mentioned above, users typically interact with online content management system 120 through an application 214 on an electronic device 200, such as content management client applications 112 and/or applications 116 executing on client devices 110 of FIG. 1. To facilitate these user interactions, application 214 may include an interface module 206 that provides a user interface to a user of electronic device 200 and communicates with interface module 122 of online content management system 120. For example, interface module 206 may provide a file explorer, file finder, file chooser, and/or browser application that allows the user to access and/or update data in online content management system 120. In other words, interface modules 122 and 206 may provide an interface with modeling apparatus 202 and enable lookup of data in graph-based data model 204.

More specifically, application 214 may verify that the user is logged into online content management system 120. If the user is not logged into online content management system 120, application 214 may provide a dialog box and/or one or more other user-interface elements through interface module 206 that allow the user to provide authentication credentials (e.g., username and password) for a user account and/or create a user account with online content management system 120.

Once the user is authenticated with online content management system 120, application 214 may enable access to the user's content items with online content management system 120 through interface module 206. For example, application 214 may allow the user to navigate a hierarchical directory structure containing directories, sub-directories, files, and/or other content items associated with the user account through interface module 206. Application 214 may also display content items and/or other data associated with the user based on the user's groups, collections of content items, and/or other associations in graph-based data model 204. Application 214 may also copy a portion of data related to the user, the user's associations, and/or the user's content items to a cache 208 on electronic device 200 for subsequent use and/or retrieval by the user.

Those skilled in the art will appreciate that conventional storage mechanisms for graph-based data model 204 may be associated with a tradeoff between scalability and ease of partitioning and atomicity, consistency, isolation, and durability (ACID). In particular, the use of a relational database, such as a Structured Query Language (SQL) database, to store graph-based data model 204 may enable the use of transactions and guarantee ACID properties while requiring manual rewriting of code for graph-based data model 204 to partition graph-based data model 204. On the other hand, the use of a graph database, such as a NoSQL database, to store graph-based data model 204 may enable automatic partitioning of graph-based data model 204 but may not support transactions that enforce ACID properties in graph-based data model 204.

In one or more embodiments, online content management system 120 includes functionality to store and/or manage graph-based data model 204 in a way that facilitates partitioning and scaling of graph-based data model 204 and enables the use of transactions in updating graph-based data model 204. First, a modeling apparatus 202 in online content management system 120 may store graph-based data model 204 in partitions 210-212 so that each partition contains one or more nodes in graph-based data model 204 and all outgoing edges from the node(s). Such partitioning of graph-based data model 204 may expedite both lookup of data in graph-based data model 204 and subsequent partitioning of graph-based data model 204 (e.g., as the amount of data in graph-based data model 204 grows).

As mentioned above, interface modules 122 and 206 may provide an interface that enables lookup of a set of outgoing edges associated with a source node from graph-based data model 204. For example, the interface may allow the user to access groups, contacts, collections of content items, individual content items, and/or other data associated with the user in graph-based data model 204.

To perform lookup of graph-based data model 204, the interface may obtain an identifier for a source node from the set of nodes in graph-based data model 204, identify the partition (e.g., partitions 210-212) containing the source node, and search the outgoing edges by the identifier. For example, the interface may obtain an identifier for a node representing a collection of content items (e.g., after the user selects a graphical element representing the collection within interface module 206) and locate the partition containing the node. The interface may then search outgoing edges from the node to identify the set of content items in the collection and/or provide the content items to the user. Because the outgoing edges are stored on the same partition as the node, the lookup may be performed with only the partition and require less time than a lookup that is conducted across multiple partitions and/or machines.

The interface may also enable filtering of the outgoing edges by an attribute associated with the outgoing edges. For example, the interface may match attributes of the outgoing edges to prefixes, strings, ranges of values, regular expressions, and/or other types of data. Consequently, the interface may allow the user to identify a specific association and/or type of association in graph-based data model 204.

The interface may additionally enable subsequent lookup of other nodes and/or directed edges associated with the source node. First, the interface may obtain one or more destination nodes associated with (e.g., connected to) the outgoing edges of the source node and search a set of additional outgoing edges associated with the destination node(s). The interface may repeat the process until nodes and/or edges of a certain length from the source node have been searched. For example, a lookup of all users in a group that begins with a node for a user in the group may first identify the group using a directed edge from the user to the group, then identify the other users in the group using directed edges from the group to the other users.

As mentioned above, modeling apparatus 202 and/or the interface may update graph-based data model 204 using a set of transactions, thus enforcing ACID properties in graph-based data model 204. In particular, modeling apparatus 202 and/or the interface may enable locking of a node and one or more outgoing edges from the node during a transaction associated with the node and an edge type of the outgoing edge(s). For example, a transaction that adds an association between a collection and a user may lock the user's node and outgoing edges from the user's node to collections while an outgoing edge from the user to the collection is created and the number of collections associated with the user is updated. While the node and outgoing edges are locked, changes (e.g., additions, deletions, modifications, etc.) associated with the node and outgoing edges by other operations may be disabled. Modeling apparatus 202 and/or the interface may then enable unlocking of the node and the outgoing edge(s) after the transaction is complete to enable subsequent operations associated with the node and/or outgoing edge(s).

Furthermore, modeling apparatus 202 and/or the interface may enable rollback of graph-based data model 204 to a previous state of the node and the outgoing edge(s) by tracking previous versions of graph-based data model 204. For example, modeling apparatus 202 may track different versions of graph-based data model 204 over time in "snapshots" and/or log tables of changes to graph-based data model 204. If a rollback is initiated because of a transaction failure and/or the undoing of a change to graph-based data model 204 by a user and/or online content management system 120, modeling apparatus 202 may use the tracked versions to revert graph-based data model 204 to the version associated with the rollback.

By storing data in nodes and directed edges of graph-based data model 204, the system of FIG. 2 may enable automatic partitioning of the data and facilitate scaling of graph-based data model 204. Moreover, the collocation of all outgoing edges from a node in the same partition as the node may improve the performance of queries and/or lookups of graph-based data model 204 over queries and/or lookups that are more complex and/or run across multiple machines and/or partitions. At the same time, the use of transactions to update graph-based data model 204 may allow ACID properties to be enforced, thereby improving the reliability and/or integrity of graph-based data model 204.

Those skilled in the art will appreciate that the system of FIG. 2 may be implemented in a variety of ways. As mentioned above, each partition 210-212 of graph-based data model 204 may be stored as a "master" partition and/or one or more "slave" partitions. In addition, the "master" and "slave" partitions may reside in relational databases, flat file storage, and/or other mechanisms for storing structured data.

Moreover, the functionality of interface module 122 and/or modeling apparatus 202 may be provided by a single physical machine, multiple computer systems, a grid, and/or a cloud computing system. For example, one or more web and/or client servers implementing interface module 122 may communicate with one or more instances of modeling apparatus 202 to access data in graph-based data model 204.

Finally, modeling apparatus 202, interface modules 122 and/or 206, and graph-based data model 204 may be used to store and/or enable access to any type of associative data. For example, graph-based data model 204 may include data that represents the hierarchy of an organization, a social network, and/or other types of taxonomies and/or network structures. In turn, modeling apparatus 202 and interface modules 122 and/or 206 may facilitate use of graph-based data model 204 with a variety of applications (e.g., application 214) associated with accessing and/or using data in graph-based data model 204.

Figure 3A:
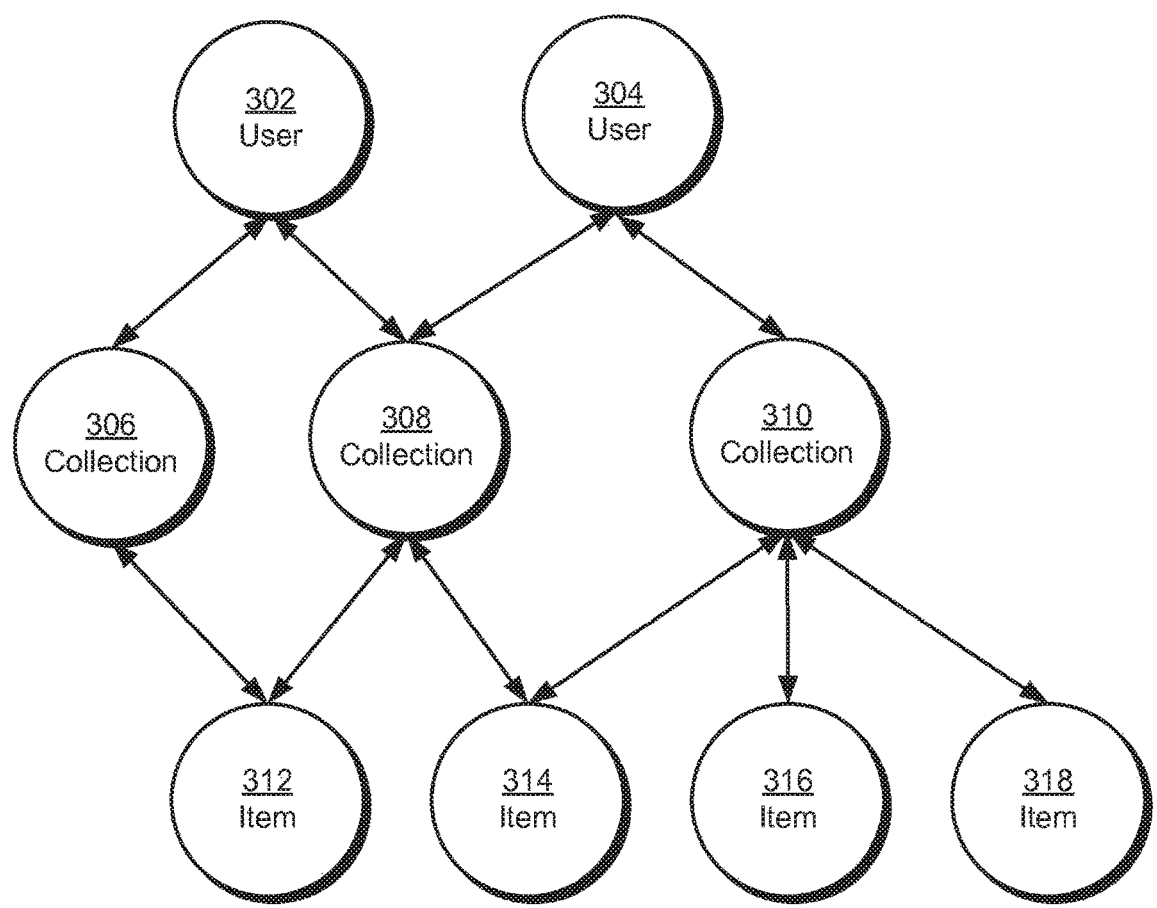
FIG. 3A shows an exemplary graph-based data model in accordance with the disclosed embodiments.

FIG. 3A shows an exemplary graph-based data model (e.g., graph-based data model 204 of FIG. 2) in accordance with the disclosed embodiments. As shown in FIG. 3A, the graph-based data model includes nodes representing a set of users 302-304, a set of collections 306-310, and a set of items 312-318.

The graph-based data model also includes a set of directed edges among the nodes, which represent associations and/or relationships between pairs of objects and/or entities corresponding to the nodes. For example, user 302 may have outgoing edges to collections 306-308, and user 304 may have outgoing edges to collections 308-310. At the same time, collections 306-308 may have outgoing edges to user 302, and collections 308-310 may have outgoing edges to user 304. Similarly, collection 306 may have an outgoing edge to item 312, collection 308 may have outgoing edges to items 312-314, and collection 310 may have outgoing edges to items 314-318. In turn, item 312 may have outgoing edges to collections 306-308, item 314 may have outgoing edges to collections 308-310, and items 316-318 may each have an outgoing edge to collection 310.

The use of bidirectional edges in connecting users 302-304, collections 306-310, and items 312-3318 may allow lookups to occur from either node in an association, thus facilitating searching of the graph-based data model. For example, an association between user 304 and collection 308 may be identified by looking up outgoing edges from either user 304 or collection 308.

The graph-based data model may be used with an online content management system (e.g., online content management system 120 of FIG. 1) and/or other application associated with users 302-304, collections 306-310, and items 312-318. For example, directed edges among items 312-318 (e.g., content items) and collections 306-310 may depict the inclusion of items 312-318 in collections 306-310, while directed edges among collections 306-310 and users 302-304 may indicate the users' ability to access collections 306-310 and, in turn, items 312-318 in collections 306-310.

Figure 3B:
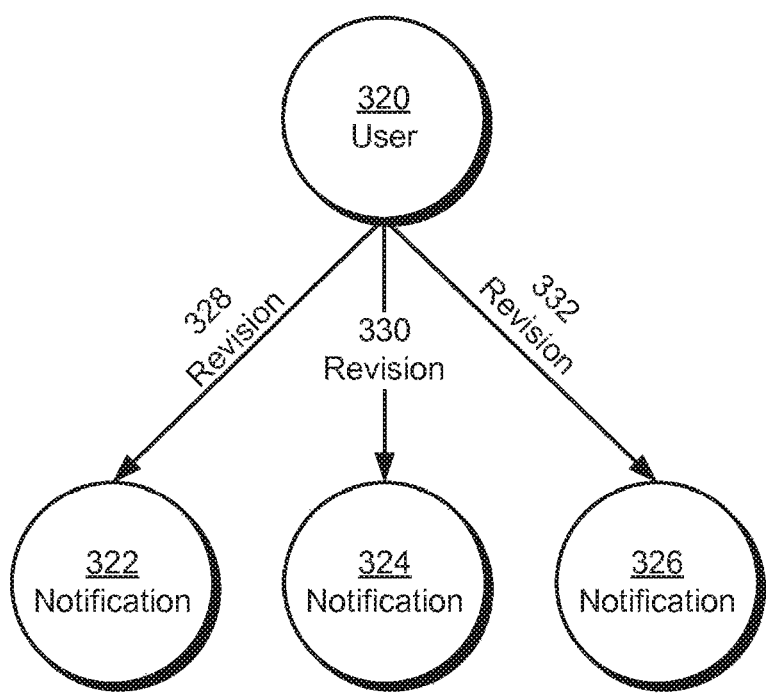
FIG. 3B shows an exemplary graph-based data model in accordance with the disclosed embodiments.

FIG. 3B shows an exemplary graph-based data model in accordance with the disclosed embodiments. As with the graph-based data model of FIG. 3A, the graph-based data model of FIG. 3B includes a set of nodes and a set of directed edges among the nodes. Unlike the graph-based model of FIG. 3A, the graph-based model of FIG. 3B includes nodes representing a user 320 and a set of notifications 322-326 and three outgoing (e.g., unidirectional) edges from user 320 to notifications 322-326.

As shown in FIG. 3B, the edges represent revisions 328-332 associated with user 320. For example, revisions 328-332 may be made to a shared folder of an online content management system (e.g., online content management system 120 of FIG. 1) by user 320. In addition, each revision 328-332 may trigger the generation of a corresponding notification 322-326 of the revision to other users with access to the shared folder. If another user has previously received notifications 322-324 through the online content management system, only notification 326 may be provided to the other user the next time the other user accesses the online content management system. On the other hand, if the other user has not received any notifications 322-326, all three notifications 322-326 may be provided to the other user the next time the other user accesses the online content management system.

Figure 3C:
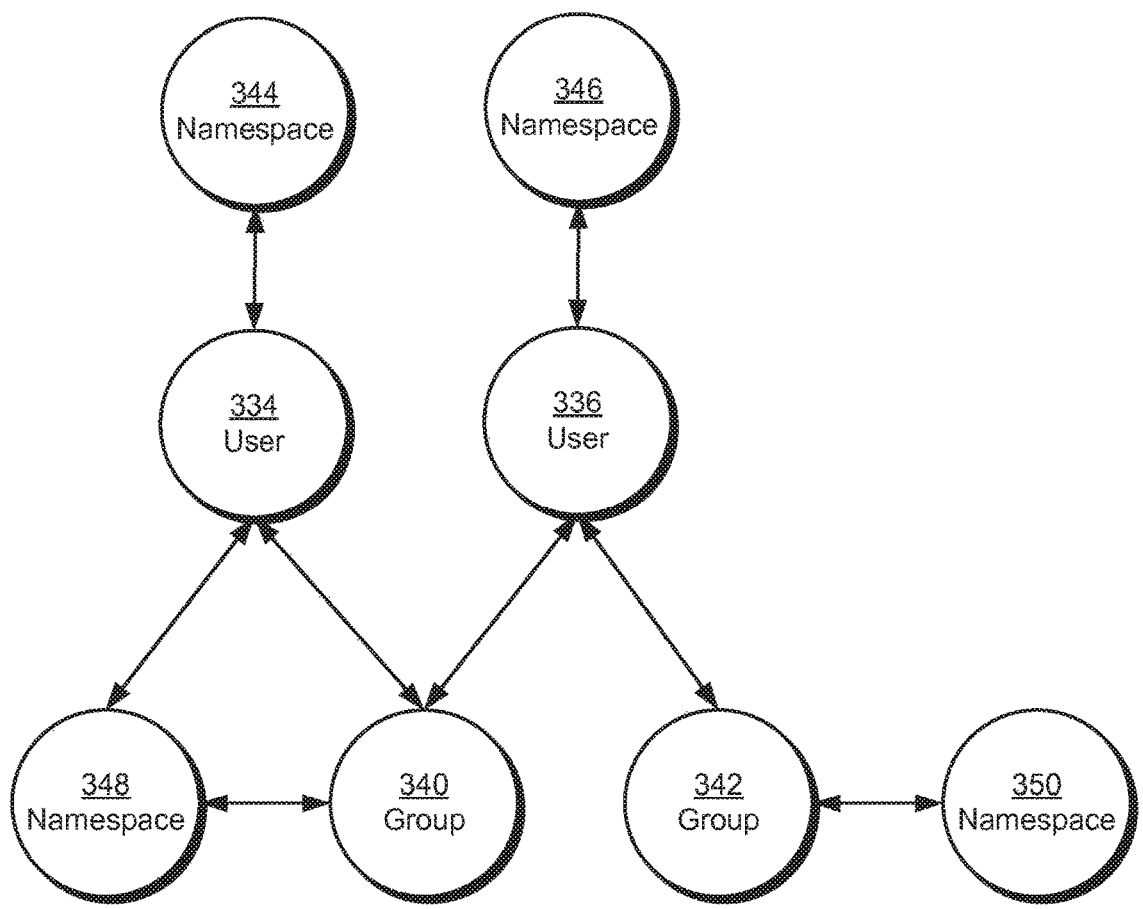
FIG. 3C shows an exemplary graph-based data model in accordance with the disclosed embodiments.

FIG. 3C shows an exemplary graph-based data model in accordance with the disclosed embodiments. The graph-based data model includes nodes representing a set of users 334-336, a set of groups 340-342, and a set of namespaces 344-350. Like the graph-based data model of FIG. 3A, the graph-based data model of FIG. 3C includes a set of bidirectional edges connecting the nodes.

The graph-based data model of FIG. 3C may also be used with an online content management system, such as online content management system 120 of FIG. 1. In particular, groups 340-342 may represent groups of users (e.g., users 334-336) in the online content management system, with bidirectional edges between a user and a group indicating membership of the user in the group. For example, users 334-336 may both belong to group 340, while only user 336 may belong to group 342.

In addition, namespaces 344-346 may represent a set of content items, folders, data, and/or other resources associated with a user or group. In addition, access to the resources in a namespace may be represented by a bidirectional edge between the namespace and the user or group. For example, bidirectional edges in the graph-based data model may indicate that namespace 344 represents the resources of user 334, namespace 346 represents the resources of user 336, namespace 348 represents the resources of group 340, and namespace 350 represents the resources of group 342.

On the other hand, membership of a user in a group may not automatically grant the user access to the group's namespace. For example, a bidirectional edge between user 334 and namespace 348 may indicate that user 334 has access to a shared folder of group 340, to which user 334 belongs. In addition, the edge may include an attribute describing the type of access (e.g., read, write, etc.) granted to user 334 in accessing namespace 348. On the other hand, a bidirectional edge does not exist between user 336 and namespace 350, indicating that user 336 is not granted access to a shared folder of group 342 despite the membership of user 336 in group 342.

Figure 4:
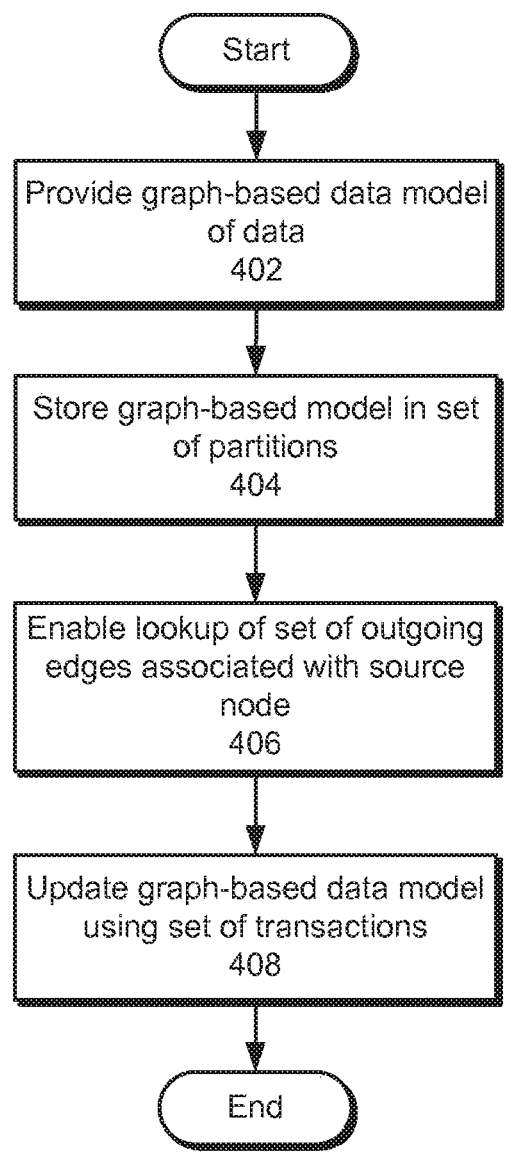
FIG. 4 shows a flowchart illustrating the process of managing access to data in accordance with the disclosed embodiments.

FIG. 4 shows a flowchart illustrating the process of managing access to data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a graph-based data model of the data is provided (operation 402). The graph-based model may include a set of nodes and a set of directed edges among the nodes. To facilitate searching of the graph-based data model, the directed edges may include a first directed edge from a first node to a second node and a second directed edge from the second node to the first node. The graph-based model may thus represent a set of entities and/or objects, as well as a set of associations and/or relationships among the entities and/or objects. For example, the nodes may represent users, collections, items, notifications, groups, and/or namespaces. Next, the graph-based model is stored in a set of partitions (operation 404). Each partition may include one or more nodes and all outgoing edges from the node(s).

Lookup of a set of outgoing edges associated with a source node (operation 406) from the node(s) in the partition may then be enabled. In particular, the partition containing the source node may be identified (e.g., based on an identifier for the source node and an index to the partition), and the outgoing edges may be searched by the identifier. The outgoing edges may also be filtered by an attribute associated with the outgoing edges. For example, outgoing edges with a name and/or other attribute that matches a prefix, value, and/or range may be provided. The lookup may also enable subsequent lookup of nodes and/or other directed edges associated with the source node. For example, the lookup may obtain one or more destination nodes associated with the outgoing edges and search a set of additional outgoing edges associated with the one or more destination nodes until nodes and/or outgoing edges within a certain length from the source node have been searched.

Finally, the graph-based data model is updated using a set of transactions (operation 408). To update the graph-based data model, locking of a node and one or more outgoing edges associated with the node may be enabled during a transaction associated with the node and an edge type of the one or more outgoing edges. Unlocking of the node and the outgoing edge(s) may then be enabled after the transaction is complete. Moreover, rollback of the graph-based data model to a previous state of the node and the outgoing edge(s) may be enabled to handle transaction failures and/or undoing of changes to the graph-based data model.

Figure 5:
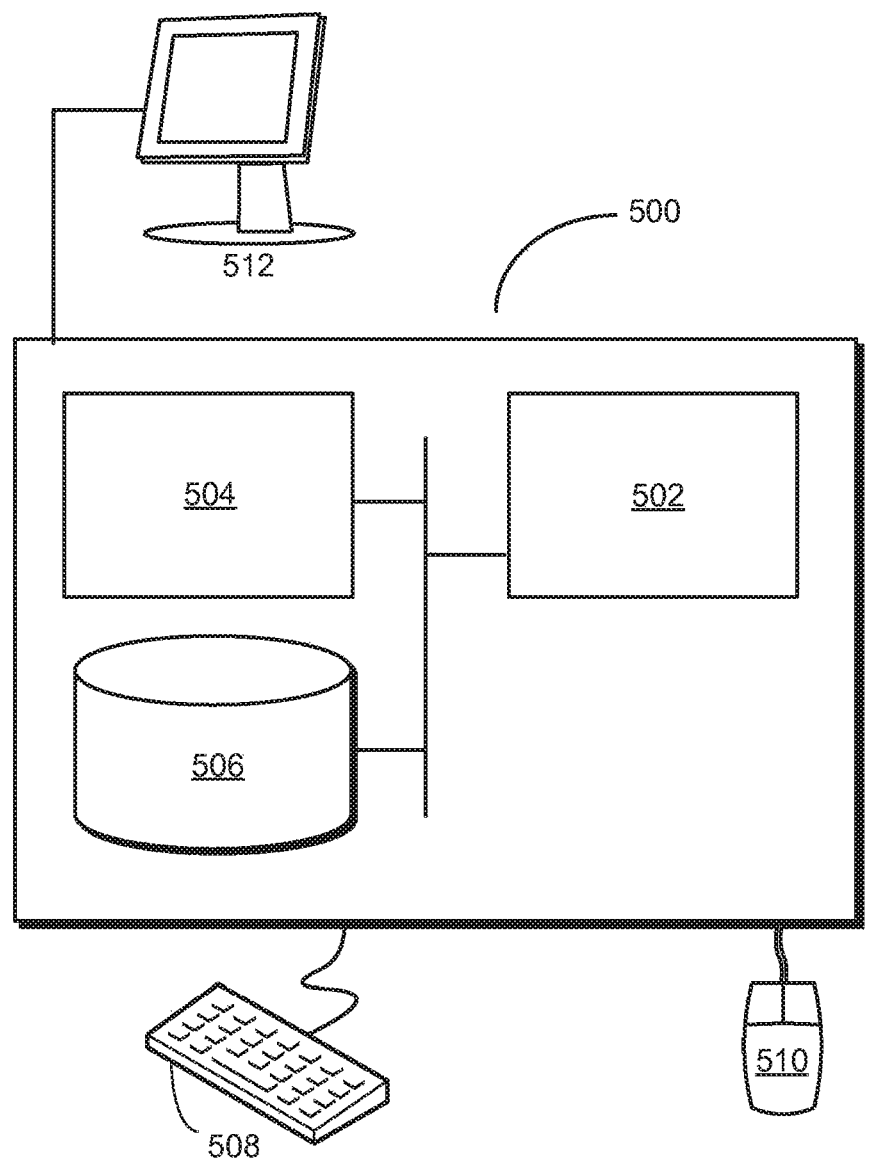
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for managing access to data. The system may include a modeling apparatus that provides a graph-based data model of the data, which includes a set of nodes and a set of directed edges among the nodes. The modeling apparatus may also store the graph-based data model in a set of partitions, such that each partition from the set of partitions includes one or more nodes from the set of nodes and all outgoing edges from the one or more nodes. The system may also include an interface with the modeling apparatus that enables lookup of a set of outgoing edges associated with a source node from the one or more nodes. Moreover, the modeling apparatus and/or interface may update the graph-based data model using a set of transactions.

In addition, one or more components of computer system 500 may be remotely located and connected to the other components over a network. Portions of the present embodiments (e.g., modeling apparatus, interface, etc.) may also be located on different nodes of a distributed system that implements the embodiments. For example, the present embodiments may be implemented using a cloud computing system that enables reliable concurrent access to and/or partitioning of data in a graph-based data model from a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The invention claimed is:

1. A method of managing access to data, comprising:
at one or more computer systems comprising processors, memory, and storage:
storing a plurality of data items across a plurality of partitions;
wherein the storing comprises storing a graph-based data model that associates each data item of the plurality of data items with an identifier of a source entity pertaining to the data item, an identifier of a destination entity pertaining to the data item, and an identifier of a type of directed relationship, pertaining to the data item, from the source entity to the destination entity;
receiving a lookup request specifying an identifier of a particular source entity, an identifier of a particular destination entity, and an identifier of a particular type of directed relationship from the particular source entity to the particular destination entity;
based on the identifier of the particular source entity specified in the lookup request, identifying a partition of the plurality of partitions; and
returning a response to the lookup request, the response comprising a particular data item that is both:
(a) stored in the identified partition; and
(b) associated in the identified partition, according to the graph-based data model, with all of:
(b1) the identifier of the particular source entity,
(b2) the identifier of the destination entity, and
(b3) the identifier of the type of directed relationship.

2. The method of claim 1, wherein the particular source entity is a user having a user account with an online content management system; and wherein the particular destination entity is a collection of content items under management of the online content management system.

3. The method of claim 1, wherein the particular source entity is a collection of content items under management of an online content management system; and wherein the particular destination entity is a user having a user account with the online content management system.

4. The method of claim 1, wherein the particular data item returned in the response represents permissions that a user having a user account with an online content management system has with respect to a collection of content items under management of the online content management system, the user having the user account identified by the identifier of the particular source entity, the collection of content items identified by the identifier of the particular destination entity.

5. The method of claim 1, wherein the particular data item returned in the response represents permissions that a user having a user account with an online content management system has with respect to a collection of content items under management of the online content management system, the collection of content items identified by the identifier of the particular source entity, the user account identified by the identifier of the particular destination entity in the lookup request.

6. The method of claim 1, further comprising:
storing a new data item in the plurality of partitions in context of a transaction, the new data item associated with a source entity identifier, a directed relationship type identifier, and a destination entity identifier; and
wherein storing the new data item in the plurality of partitions in the context of the transaction comprises performing:
(a) identifying a particular partition, of the plurality of partitions, based at least in part on the source entity identifier associated with the new data item;
(b) locking all existing data items in the particular partition associated in the particular partition with both:
(b1) the source entity identifier associated with the new data item and
(b2) the directed relationship type identifier associated with the new data item;
(c) storing the new data item in the particular partition in association with all of:
(c1) the source entity identifier associated with the new data item,
(c2) the directed relationship type identifier associated with the new data item, and
(c3) the destination entity identifier associated with the new data item; and
(d) unlocking all of the existing data items.

7. The method of claim 1, wherein each partition of the plurality of partitions is stored in a relational database.

8. The method of claim 1, wherein the plurality of partitions is stored across a plurality of machines.

9. The method of claim 1, further comprising:
adding the particular data item returned in the response to a cache including associating, according to the graph-based data model, the particular data item in the cache with all of:
(a) the identifier of the particular source entity;
(b) the identifier of the particular destination entity; and
(c) the identifier of the particular type of directed relationship.

10. The method of claim 1, wherein:
the lookup request is a first lookup request;
the response is a first response;
the method further comprises:
receiving a second lookup request specifying the identifier of the particular source entity and the identifier of the particular type of directed relationship;
responsive to receiving the second lookup request, identifying, based on the identifier of the particular source entity specified in the second lookup request, the partition of the plurality of partitions; and
returning a second response to the second lookup request, the second response comprising data items, each of the data items both:
(a) stored in the identified partition; and
(b) associated in the identified partition, according to the graph-based data model, with both: (b1) the identifier of the particular source entity and (b2) the identifier of the particular type of directed relationship.

11. A system for managing access to data, the system comprising:
one or more processors;
one of more computer-readable media storing one or more computers programs, the one or more computer programs configured for:
storing a plurality of data items across a plurality of partitions;
wherein the storing comprises storing a graph-based data model that associates each data item of the plurality of data items with an identifier of a source entity pertaining to the data item, an identifier of a destination entity pertaining to the data item, and an identifier of a type of directed relationship, pertaining to the data item, from the source entity to the destination entity;
receiving a lookup request specifying an identifier of a particular source entity, an identifier of a particular destination entity, and an identifier of a particular type of directed relationship from the particular source entity to the particular destination entity;
based on the identifier of the particular source entity specified in the lookup request, identifying a partition of the plurality of partitions; and
returning a response to the lookup request, the response comprising a particular data item that is both:
(a) stored in the identified partition; and
(b) associated in the identified partition, according to the graph-based data model, with all of: (b1) the identifier of the particular source entity, (b2) the identifier of the destination entity, and (b3) the identifier of the type of directed relationship.

12. The system of claim 11, wherein the particular source entity is a user having a user account with an online content management system; and wherein the particular destination entity is a collection of content items under management of the online content management system.

13. The system of claim 11, wherein the particular source entity is a collection of content items under management of an online content management system; and wherein the particular destination entity is a user having a user account with the online content management system.

14. The system of claim 11, wherein the particular data item returned in the response represents permissions that a user having a user account with an online content management system has with respect to a collection of content items under management of the online content management system, the user having the user account identified by the identifier of the particular source entity, the collection of content items identified by the identifier of the particular destination entity.

15. The system of claim 11, wherein the particular data item returned in the response represents permissions that a user having a user account with an online content management system has with respect to a collection of content items under management of the online content management system, the collection of content items identified by the identifier of the particular source entity, the user account identified by the identifier of the particular destination entity in the lookup request.

16. The system of claim 11, wherein the one or more computer programs are further configured for:
storing a new data item in the plurality of partitions in context of a transaction, the new data item associated with a source entity identifier, a directed relationship type identifier, and a destination entity identifier; and
wherein storing the new data item in the plurality of partitions in the context of the transaction comprises performing:
(a) identifying a particular partition, of the plurality of partitions, based at least in part on the source entity identifier associated with the new data item;
(b) locking all existing data items in the particular partition associated in the particular partition with both: (b1) the source entity identifier associated with the new data item and (b2) the directed relationship type identifier associated with the new data item;
(c) storing the new data item in the particular partition in association with all of: (c1) the source entity identifier associated with the new data item, (c2) the directed relationship type identifier associated with the new data item, and (c3) the destination entity identifier associated with the new data item; and
(d) unlocking all of the existing data items.

17. The system of claim 11, wherein each partition of the plurality of partitions is stored in a relational database.

18. The system of claim 11, wherein the one or more computer programs are further configured for:
adding the particular data item returned in the response to a cache including associating, according to the graph-based data model, the particular data item in the cache with all of: (a) the identifier of the particular source entity; (b) the identifier of the particular destination entity; and (c) the identifier of the particular type of directed relationship.

19. The system of claim 11, wherein
the lookup request is a first lookup request;
the response is a first response;
the one or more computer programs are further configured for:
receiving a second lookup request specifying the identifier of the particular source entity and the identifier of the particular type of directed relationship;
responsive to receiving the second lookup request, identifying, based on the identifier of the particular source entity specified in the second lookup request, the partition of the plurality of partitions; and returning a second response to the second lookup request, the second response comprising data items, each of the data items both: (a) stored in the identified partition; and (b) associated in the identified partition, according to the graph-based data model, with both: (b1) the identifier of the particular source entity and (b2) the identifier of the particular type of directed relationship.

20. One or more non-transitory computer-readable media storing one or more programs for execution by one or more processors, the one or more programs comprising instructions configured for:
   storing a plurality of data items across a plurality of partitions;
   wherein the storing comprises storing a graph-based data model that associates each data item of the plurality of data items with an identifier of a source entity pertaining to the data item, an identifier of a destination entity pertaining to the data item, and an identifier of a type of directed relationship, pertaining to the data item, from the source entity to the destination entity;
   receiving a lookup request specifying an identifier of a particular source entity, an identifier of a particular destination entity, and an identifier of a particular type of directed relationship from the particular source entity to the particular destination entity;
   based on the identifier of the particular source entity specified in the lookup request, identifying a partition of the plurality of partitions; and
   returning a response to the lookup request, the response comprising a particular data item that is both:
   (a) stored in the identified partition; and
   (b) associated in the identified partition, according to the graph-based data model, with all of:
   (b1) the identifier of the particular source entity,
   (b2) the identifier of the destination entity, and
   (b3) the identifier of the type of directed relationship.

21. The one or more non-transitory computer-readable media of claim 20, wherein the particular source entity is a user having a user account with an online content management system; and wherein the particular destination entity is a collection of content items under management of the online content management system.

22. The one or more non-transitory computer-readable media of claim 20, wherein the particular source entity is a collection of content items under management of an online content management system; and wherein the particular destination entity is a user having a user account with the online content management system.

23. The one or more non-transitory computer-readable media of claim 20, wherein the particular data item returned in the response represents permissions that a user having a user account with an online content management system has with respect to a collection of content items under management of the online content management system, the user having the user account identified by the identifier of the particular source entity, the collection of content items identified by the identifier of the particular destination entity.

24. The one or more non-transitory computer-readable media of claim 20, wherein the particular data item returned in the response represents permissions that a user having a user account with an online content management system has with respect to a collection of content items under management of the online content management system, the collection of content items identified by the identifier of the particular source entity, the user account identified by the identifier of the particular destination entity in the lookup request.

25. The one or more non-transitory computer-readable media of claim 20, the instructions further configured for:
   storing a new data item in the plurality of partitions in context of a transaction, the new data item associated with a source entity identifier, a directed relationship type identifier, and a destination entity identifier; and
   wherein storing the new data item in the plurality of partitions in the context of the transaction comprises performing:
   (a) identifying a particular partition, of the plurality of partitions, based at least in part on the source entity identifier associated with the new data item;
   (b) locking all existing data items in the particular partition associated in the particular partition with both:
   (b1) the source entity identifier associated with the new data item and
   (b2) the directed relationship type identifier associated with the new data item;
   (c) storing the new data item in the particular partition in association with all of:
   (c1) the source entity identifier associated with the new data item,
   (c2) the directed relationship type identifier associated with the new data item, and
   (c3) the destination entity identifier associated with the new data item; and
   (d) unlocking all of the existing data items.

26. The one or more non-transitory computer-readable media of claim 20, wherein each partition of the plurality of partitions is stored in a relational database.

27. The one or more non-transitory computer-readable media of claim 20, wherein the plurality of partitions is stored across a plurality of machines.

28. The one or more non-transitory computer-readable media of claim 20, the instructions further configured for:
   adding the particular data item returned in the response to a cache including associating, according to the graph-based data model, the particular data item in the cache with all of:
   (a) the identifier of the particular source entity;
   (b) the identifier of the particular destination entity; and
   (c) the identifier of the particular type of directed relationship.

29. The one or more non-transitory computer-readable media of claim 20, wherein:
   the lookup request is a first lookup request;
   the response is a first response;
   the instructions are further configured for:
   receiving a second lookup request specifying the identifier of the particular source entity and the identifier of the particular type of directed relationship;
   responsive to receiving the second lookup request, identifying, based on the identifier of the particular source entity specified in the second lookup request, the partition of the plurality of partitions; and
   returning a second response to the second lookup request, the second response comprising data items, each of the data items both:
   (a) stored in the identified partition; and
   (b) associated in the identified partition, according to the graph-based data model, with both: (b1) the identifier of the particular source entity and (b2) the identifier of the particular type of directed relationship.

* * * * *